United States Patent
Bourlon et al.

(10) Patent No.: US 9,738,822 B2
(45) Date of Patent: Aug. 22, 2017

(54) COMPOSITIONS AND METHODS FOR CEMENTING WELLS

(71) Applicant: Schlumberger Technology Corporation, Sugar land, TX (US)

(72) Inventors: Arnaud Joseph Gino Bourlon, Paris (FR); Olivier Porcherie, Paris (FR); Sylvaine Le Roy-Delage, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 191 days.

(21) Appl. No.: 14/503,255

(22) Filed: Sep. 30, 2014

(65) Prior Publication Data
US 2015/0090451 A1    Apr. 2, 2015

(30) Foreign Application Priority Data
Oct. 2, 2013 (EP) .................................. 13306370

(51) Int. Cl.
*E21B 33/13* (2006.01)
*C09K 8/487* (2006.01)
(Continued)

(52) U.S. Cl.
CPC ............. *C09K 8/487* (2013.01); *C04B 28/02* (2013.01); *C09K 8/467* (2013.01); *E21B 33/13* (2013.01); *E21B 33/14* (2013.01); *Y02W 30/94* (2015.05)

(58) Field of Classification Search
CPC ......... C04B 28/02; C04B 28/00; C04B 28/04; E21B 33/13; E21B 33/14
See application file for complete search history.

(56) References Cited

U.S. PATENT DOCUMENTS

| 4,304,298 A | 12/1981 | Sutton |
| 4,333,764 A | 6/1982 | Richardson |

(Continued)

FOREIGN PATENT DOCUMENTS

| EP | 0124227 | 11/1984 |
| WO | 03/102107 | 12/2003 |

(Continued)

OTHER PUBLICATIONS

Nelson EB and Guillot D (eds.): Well Cementing—2nd Edition, Houston: Schlumberger (2006).

(Continued)

*Primary Examiner* — Zakiya W Bates
(74) *Attorney, Agent, or Firm* — Andrea E. Tran (57) ABSTRACT

A well cementing composition comprises water, an inorganic cement, a gas generating agent and a gas stabilizer. The gas generating agent may contain materials that release hydrogen gas, carbon dioxide gas or nitrogen gas or combinations thereof. The gas stabilizer comprises an aqueous mixture comprising polyglycols, oxyalkylates and methanol, or coco trimethyl ammonium chloride, or a mixture comprising ammonium fatty alcohol ether sulfate and ethylene glycol monobutyl ether, or combinations thereof. When used to cement a subterranean well, the compositions improve the compressive strength, increase the rate at which compressive strength develops, preserve cement homogeneity, or enhance cement expansion or a combination thereof.

12 Claims, 5 Drawing Sheets

(51) Int. Cl.
*C09K 8/467* (2006.01)
*E21B 33/14* (2006.01)
*C04B 28/02* (2006.01)

(56) References Cited

U.S. PATENT DOCUMENTS

| | | | |
|---|---|---|---|
| 4,340,427 A * | 7/1982 | Sutton | C04B 22/00 |
| | | | 106/640 |
| 4,367,093 A | 1/1983 | Burkhalter et al. | |
| 4,450,010 A | 5/1984 | Burkhalter et al. | |
| 4,565,578 A | 1/1986 | Sutton et al. | |
| 4,691,558 A | 9/1987 | Vinson et al. | |
| 5,293,938 A | 3/1994 | Onan et al. | |
| 5,996,693 A | 12/1999 | Heathman | |
| 6,270,565 B1 | 8/2001 | Heathman | |
| 6,715,553 B2 | 4/2004 | Reddy et al. | |
| 6,722,434 B2 | 4/2004 | Reddy et al. | |
| 6,858,566 B1 | 2/2005 | Reddy et al. | |
| 6,992,048 B2 | 1/2006 | Reddy et al. | |
| 7,073,584 B2 | 7/2006 | Reddy et al. | |
| 7,156,175 B2 | 1/2007 | Reddy et al. | |
| 7,334,638 B2 | 2/2008 | Santra et al. | |
| 7,473,313 B2 | 1/2009 | Santra et al. | |
| 7,642,223 B2 | 1/2010 | Santra et al. | |
| 7,722,954 B2 | 5/2010 | Santra et al. | |
| 7,792,250 B1 | 9/2010 | Iverson et al. | |
| 7,878,270 B2 | 2/2011 | Lee et al. | |
| 2003/0221831 A1 | 12/2003 | Reddy et al. | |
| 2004/0171499 A1 | 9/2004 | Ravi et al. | |
| 2006/0283357 A1 | 12/2006 | Santra et al. | |
| 2006/0283595 A1 | 12/2006 | Santra et al. | |
| 2007/0022917 A1 | 2/2007 | Chatterji et al. | |
| 2009/0007375 A1 | 1/2009 | Frank | |
| 2012/0175118 A1 | 7/2012 | Khatri et al. | |

FOREIGN PATENT DOCUMENTS

| | | |
|---|---|---|
| WO | 03/102108 | 12/2003 |
| WO | 03/102361 | 12/2003 |
| WO | 2004/099557 | 11/2004 |
| WO | 2005/047212 | 5/2005 |
| WO | 2006/134355 | 12/2006 |

OTHER PUBLICATIONS

Recommended Practice for Testing Well Cements, ANSI/API Recommended Practice 10B-2, 1st Edition, Washington DC: American Petroleum Institute (2005).

* cited by examiner

COMPOSITIONS AND METHODS FOR CEMENTING WELLS

CROSS REFERENCE TO RELATED APPLICATION

The current application claims the benefit and priority of European Patent Application No. 13306370.1, filed on Oct. 2, 2013, the entire contents of which are hereby incorporated by reference into the current application.

BACKGROUND

The statements in this section merely provide background information related to the present disclosure and may not constitute prior art.

This disclosure relates to compositions and methods for improving the performance of energized cement systems for well cementing applications.

Primary cementing is the process of placing cement in the annulus between the casing and the formations exposed to wellbore. Alternatively, cement may be placed in the annular region between two casing strings. The major objective of primary cementing is to provide zonal isolation in wells; for example, to exclude fluids such as water or gas in one zone from oil in another zone in the well, or to protect aquifers from contamination by oil or gas emanating from zones further downhole. To achieve this objective, a hydraulic seal is created between the casing and cement and between the cement and the formations, while at the same time preventing the formation of fluid channels within the cement sheath.

The basic process for accomplishing a primary cementing job employs the two-plug method for pumping and displacement. After the well is drilled to the desired depth, the drillpipe is removed and a larger-diameter casing string is normally run to the bottom of the well. At this time, drilling mud is still in the wellbore. This mud is then displaced, removed from the well and replaced by a cement slurry. To prevent contamination by mud, two plugs isolate the cement slurry as it is pumped down the casing. Sufficient cement slurry is pumped into the casing to fill the annular space from the bottom to at least a level that covers all of the productive zones. In addition to providing zonal isolation, the cement sheath in the annulus protects the casing from corrosion. After slurry placement, the well is shut in for a time sufficient to allow the cement to harden before completion work begins or drilling commences to a deeper horizon.

Remedial cementing consists of two broad categories: squeeze cementing and plug cementing. Squeeze cementing is the process of placing a cement slurry into a wellbore under sufficient hydraulic pressure to partially dehydrate or expel water from the cement slurry, leaving a competent cement that will harden and seal voids. Plug cementing is the placement of a limited volume of cement at a specific location inside the wellbore to create a solid seal or plug. Remedial cementing operations are performed for various reasons: to repair faulty primary cementing jobs, alter formation characteristics, repair casing and abandon wells.

For primary or remedial cementing to be successful, the cement should bond intimately with the surfaces to which it is attached—casing or formation rock. The industry has developed numerous techniques for achieving good bonding. For example, measures are usually taken to ensure that drilling fluid is efficiently removed from the annulus, ensuring that the bonding surfaces are clean and water-wet. Latexes may be added to the cement slurry to improve adhesion of the cement to the casing and formation. Or materials may be added to the cement slurry that cause the set cement to expand after it sets.

Another method for achieving improved bonding is to "energize" the cement slurry by generating gas inside the slurry in situ during placement and the setting phase. Such slurries are compressible and the resulting pressurization may ensure optimal contact between the slurry and the bonding surfaces. The presence of gas in a cement slurry may also improve fluid-loss control and help prevent migration of formation fluids into the annulus before the cement sets.

A thorough description of the primary and remedial cementing, as well as methods for improving bonding, may be found in the following publication. Nelson E B and Guillot D (eds.): *Well Cementing—2nd Edition,* Houston: Schlumberger (2006).

SUMMARY

The present disclosure provides compositions and methods for improving the performance of energized cement slurries applied in well cementing applications.

In an aspect, embodiments relate to compositions comprising water, an inorganic cement, a gas generating agent and a gas stabilizer, wherein the gas generating agent releases hydrogen gas, carbon dioxide gas or nitrogen gas or a combination thereof. In embodiments, the gas stabilizer comprises an aqueous mixture comprising polyglycols, oxyalkylates and methanol, or coco trimethyl ammonium chloride, or a mixture comprising ammonium fatty alcohol ether sulfate and ethylene glycol monobutyl ether, or combinations thereof.

In a further aspect, embodiments relate to methods for cementing a subterranean well. A cement slurry is prepared that contains water, an inorganic cement, a gas generating agent and a gas stabilizer, wherein the gas generating agent releases hydrogen gas, carbon dioxide gas or nitrogen gas or a combination thereof. The gas stabilizer comprises an aqueous mixture comprising polyglycols, oxyalkylates and methanol, or coco trimethyl ammonium chloride, or a mixture comprising ammonium fatty alcohol ether sulfate and ethylene glycol monobutyl ether, or combinations thereof. The composition is placed in the well and allowed to set. The gas stabilizer improves the compressive strength, increases the rate at which compressive strength develops, preserves cement homogeneity, or enhances cement expansion or a combination thereof.

DETAILED DESCRIPTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

In an aspect, embodiments relate to compositions comprising water, an inorganic cement, a gas generating agent and a gas stabilizer, wherein the gas generating agent releases hydrogen gas, carbon dioxide gas or nitrogen gas or a combination thereof. In embodiments, the gas stabilizer comprises an aqueous mixture comprising polyglycols, oxyalkylates and methanol, or coco trimethyl ammonium chloride, or a mixture comprising ammonium fatty alcohol ether sulfate and ethylene glycol monobutyl ether, or combinations thereof.

The inorganic cement may comprise Portland cements, calcium aluminum cements, fly ashes, lime-silica mixtures, zeolites, blast furnace slags, geopolymers or chemically bonded phosphate ceramics or combinations thereof.

The gas generating agent may release hydrogen gas and may comprise aluminum or zinc or a combination thereof. The gas generating agent may release carbon dioxide and may comprise ethylene carbonate or oxalic acid derivatives or combinations thereof. The gas generating agent may release nitrogen gas and may comprise azodicarbonamide, oxy-bis-benzene sulfonylhydrazide, toluenesulfonyl-hydrazide, benzenesulfonyl-hydrazide, toluenesulfonyl-semicarbazide, 5-phenyltetrazole, ammonium nitrite, diazoaminobenzene, 2,2'-asobixisobutyronitrile, 1,1'-azobiscyclohexanecarbonitrile, hydrazine salts or N-N'-dimethyl-N,N'-dinitrosoterephthalamide or combinations thereof. The gas generating may be a combination of the aforementioned materials, thereby releasing more than one type of gas. The gas generating agent may be aluminum metal, present at a concentration between 0.07% and 1.00% by weight of cement (BWOC), or between 0.15% and 0.5% BWOC.

The gas stabilizer may be present at a concentration between 4.45 and 26.7 L/tonne (0.05 and 0.30 gal/sk), or 13.4 and 26.7 L/tonne (0.15 and 0.30 gal/sk), or 17.8 and 26.7 L/tonne (0.20 and 0.30 gal/sk). Note that the abbreviation "sk" refers to a 94-lb sack of cement.

The composition may further comprise other additives including accelerators, retarders, dispersants, fibers, flexible particles, fluid-loss additives, gas-migration additives, extenders, expanding agents, antisettling additives or antifoam additives or weighting agents or combinations thereof. Those skilled in the art will recognize that cenospheres, glass bubbles and the like fall within the category of extenders. Those skilled in the art will also recognize that such hollow spheres should be chosen such that they can withstand the pressures exerted not only by gas generation but also the hydrostatic pressure in the well.

In a further aspect, embodiments relate to methods for cementing a subterranean well. A cement slurry is prepared that contains water, an inorganic cement, a gas generating agent and a gas stabilizer, wherein the gas generating agent releases hydrogen gas, carbon dioxide gas or nitrogen gas or a combination thereof. The gas stabilizer may comprise an aqueous mixture comprising polyglycols, oxyalkylates and methanol, or coco trimethyl ammonium chloride, or a mixture comprising ammonium fatty alcohol ether sulfate and ethylene glycol monobutyl ether, or combinations thereof. The gas stabilizer improves the compressive strength, increases the rate at which compressive strength develops, preserves cement homogeneity, or enhances cement expansion or a combination thereof. Persons skilled in the art will recognize that the addition of gas generating agents in the manner described herein does not create a foamed cement system.

The inorganic cement may comprise Portland cements, calcium aluminum cements, fly ashes, lime-silica mixtures, zeolites, blast furnace slags, geopolymers or chemically bonded phosphate ceramics or combinations thereof.

The gas generating agent may release hydrogen gas and may comprise aluminum or zinc or a combination thereof. The gas generating agent may release carbon dioxide and may comprise ethylene carbonate or oxalic acid derivatives or combinations thereof. The gas generating agent may release nitrogen gas and may comprise azodicarbonamide, oxy-bis-benzene sulfonylhydrazide, toluenesulfonyl-hydrazide, benzenesulfonyl-hydrazide, toluenesulfonyl-semicarbazide, 5-phenyltetrazole, ammonium nitrite, diazoaminobenzene, 2,2'-asobixisobutyronitrile, 1,1'-azobiscyclohexanecarbonitrile, hydrazine salts or N-N'-dimethyl-N,N'-dinitrosoterephthalamide or combinations thereof. The gas generating may be a combination of the aforementioned materials, thereby releasing more than one type of gas. The gas generating agent may be aluminum metal, present at a concentration between 0.07% and 1.00% by weight of cement (BWOC), or between 0.15% and 0.5% BWOC.

The gas stabilizer may be present at a concentration between 4.45 and 26.7 L/tonne (0.05 and 0.30 gal/sk), or 13.4 and 26.7 L/tonne (0.15 and 0.30 gal/sk), or 17.8 and 26.7 L/tonne (0.20 and 0.30 gal/sk).

The composition may further comprise other additives including accelerators, retarders, dispersants, flexible particles, fibers, fluid-loss additives, gas-migration additives, extenders, expanding agents, antifoam agents, antisettling additives or weighting agents or combinations thereof.

The present disclosure is further illustrated by the following examples.

EXAMPLES

During the experiments described in the following examples, recommended API testing procedures were followed, using API recommended test equipment. Details about the procedures and equipment may be found in the following publication. *Recommended Practice for Testing Well Cements, ANSI/API Recommended Practice 10B-2, 1st Edition, Washington D.C.: American Petroleum Institute* (2005).

Example 1

Three cement slurries were prepared. Table 1 shows the composition of a slurry that did not contain a gas generating agent (GGA) or a gas stabilizer. Table 2 shows the composition of a slurry that contained a gas generating agent without a gas stabilizer. Table 3 shows the composition of a slurry that contained both a gas generating agent and a gas stabilizer. All slurries were made with Class H cement. The density of all slurries was 1965 kg/m$^3$ (16.4 lbm/gal) and the water-to-cement ratio was 39%.

The three slurries were evaluated by measuring linear expansion, compressive strength development and thickening time. Tests were performed at 53° C. [128° F.] bottomhole circulating temperature (BHCT) and 79° C. [175° F.] bottomhole static temperature (BHST).

Figure 1:
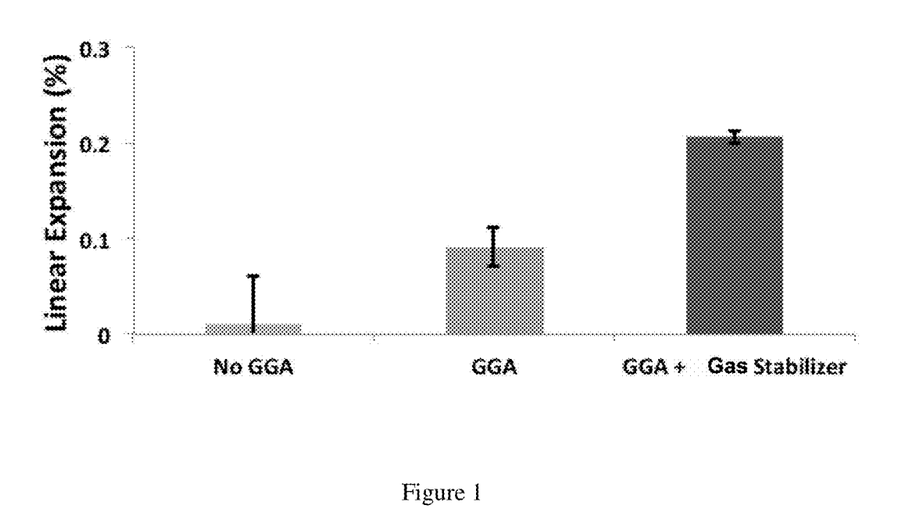
FIG. 1 is a plot illustrating the effect of a gas generating agent and a gas stabilizer on the linear expansion of a cement system.

Linear expansion of the three slurries was measured after curing for one week at 79° C. and 20.9 MPa pressure. The test procedure is described in the following publication. *Recommended Practice on Determination of Shrinkage and Expansion of Well Cement Formulations at Atmospheric Pressure, API Recommended Practice 10B-5, 1st Edition, Washington D.C.: American Petroleum Institute* (2005). The results show that the highest linear expansion was achieved by the cement formulation containing both the GGA and the gas stabilizer (FIG. 1).

Figure 2:
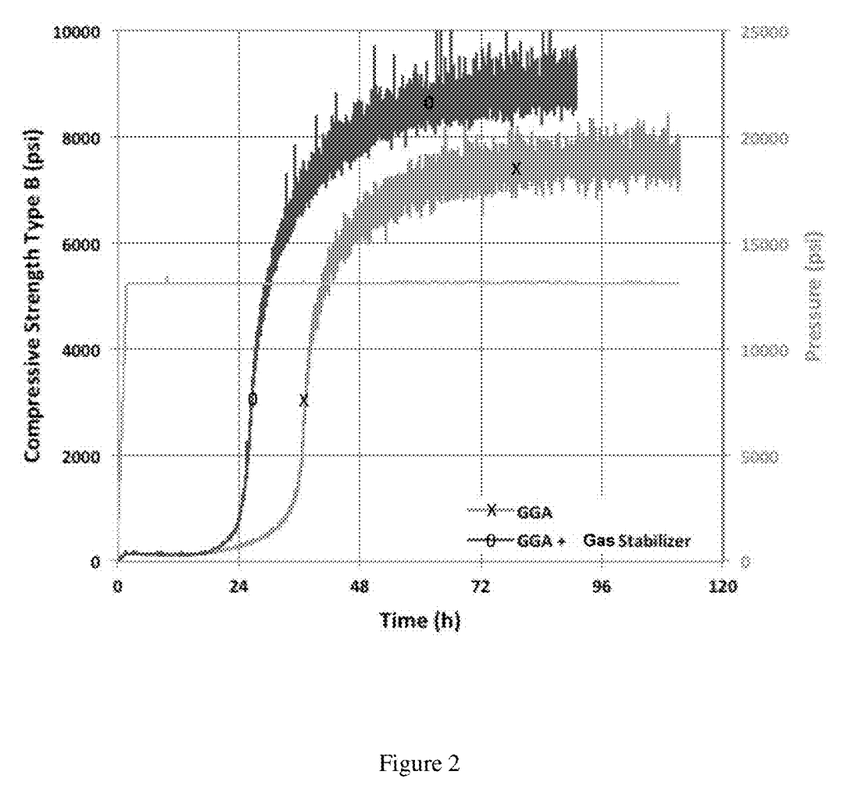
FIG. 2 is a plot comparing compressive strength development of cement systems containing a gas generating agent, with and without a gas stabilizer.

Compressive strength development was measured with an Ultrasonic Cement Analyzer. The results show that higher

TABLE 1

Additives in slurry without gas generating agent and gas stabilizer.

| Additives | |
|---|---|
| Dimethyl siloxanes and silicones solution used as antifoam agent (L/tonne) | 4.44 |
| Aqueous solution of salt of polynaphthalene sulfonate used as dispersant (L/tonne) | 12.00 |
| AMPS/acrylamide copolymer, ammonium salt and sodium chloride solution used as fluid-loss additive (L/tonne) | 12.00 |
| Polysaccharide Biopolymer used as anti-settling additive (% by weight of cement) | 0.30 |
| Sodium Lignosulfonate Cement Retarder (L/tonne) | 6.00 |

TABLE 2

Additives in slurry with gas generating agent and without gas stabilizer.

| Additives | |
|---|---|
| Dimethyl siloxanes and silicones solution used as antifoam agent (L/tonne) | 4.44 |
| Aqueous solution of salt of polynaphthalene sulfonate used as dispersant (L/tonne) | 12.00 |
| AMPS/acrylamide copolymer, ammonium salt and sodium chloride solution used as fluid-loss additive (L/tonne) | 12.00 |
| Polysaccharide Biopolymer used as anti-settling additive (% by weight of cement) | 0.30 |
| Sodium Lignosulfonate Cement Retarder (L/tonne) | 6.00 |
| Coated aluminum powder suspended in glycol as gas generating agnet (L/tonne) | 8.88 |

TABLE 3

Additives in slurry with gas generating agent and gas stabilizer.

| Additives | |
|---|---|
| Dimethyl siloxanes and silicones solution used as antifoam agent (L/tonne) | 4.44 |
| Aqueous solution of salt of polynaphthalene sulfonate used as dispersant (L/tonne) | 12.00 |
| AMPS/acrylamide copolymer, ammonium salt and sodium chloride solution used as fluid-loss additive (L/tonne) | 12.00 |
| Polysaccharide Biopolymer used as anti-settling additive (% by weight of cement) | 0.30 |
| Sodium Lignosulfonate Cement Retarder (L/tonne) | 6.00 |
| Coated aluminum powder suspended in glycol as gas generating agnet (L/tonne) | 8.88 |
| Aqueous Mixture of Polyglycols, Oxyalkylates, and Methanol as gas stabilizer (L/tonne) | 8.88 | compressive strength was achieved by the slurry that contained both the GGA and the gas stabilizer (FIG. 2).

Figure 3:
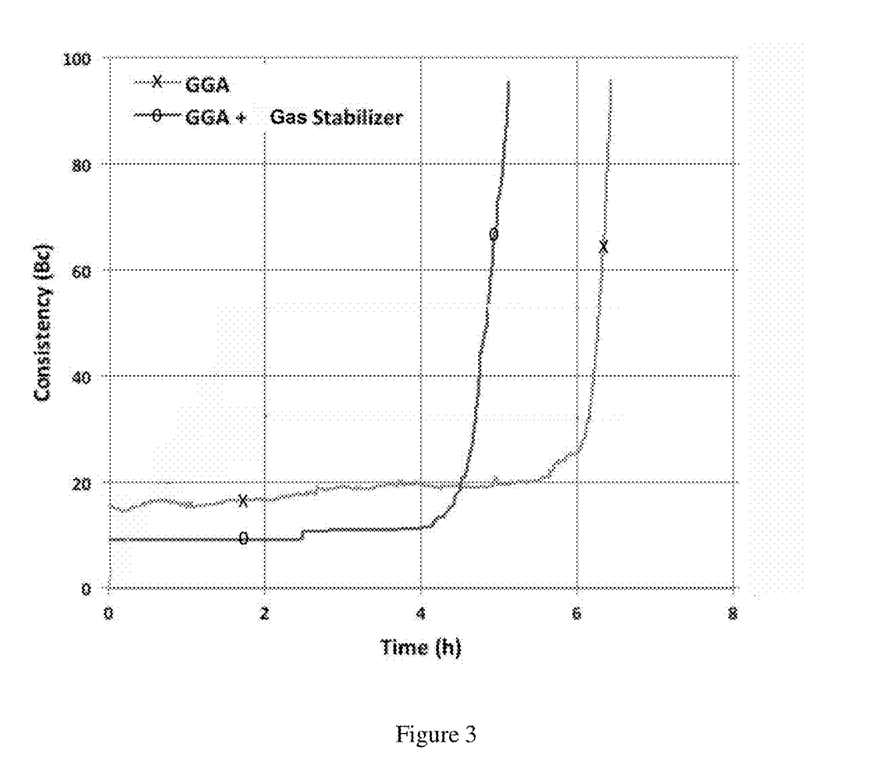
FIG. 3 is a plot comparing the thickening times of cement systems containing a gas generating agent, with and without a gas stabilizer.

The thickening time was measured with a pressurized consistometer. The results show that the thickening time of the slurry containing both the GGA and the gas stabilizer was shorter (FIG. 3).

Example 2

Three cement slurries were prepared. Table 4 shows the composition of a slurry that did not contain a gas generating agent (GGA) or a gas stabilizer. Table 5 shows the composition of a slurry that contained a gas generating agent without a gas stabilizer. Table 6 shows the composition of a slurry that contained both a gas generating agent and a gas stabilizer. All slurries were made with Class H cement. The density of all slurries was 1965 kg/m$^3$ (16.4 lbm/gal) and the water-to-cement ratio was 39%.

Figure 4:
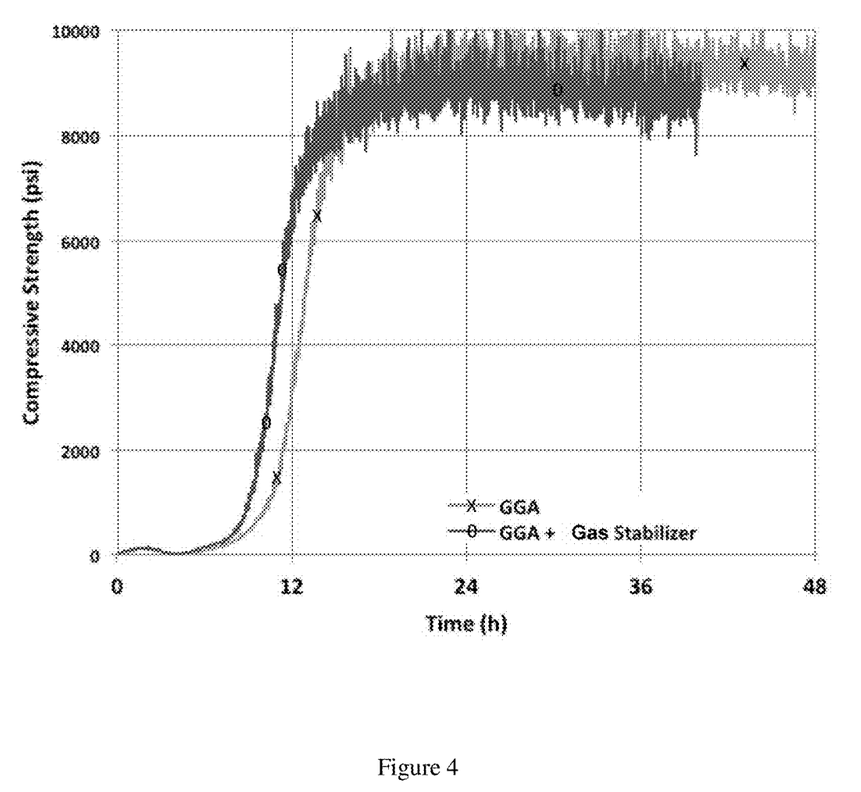
FIG. 4 is a plot comparing compressive strength development of cement systems containing a gas generating agent, with and without a gas stabilizer.
Figure 5:
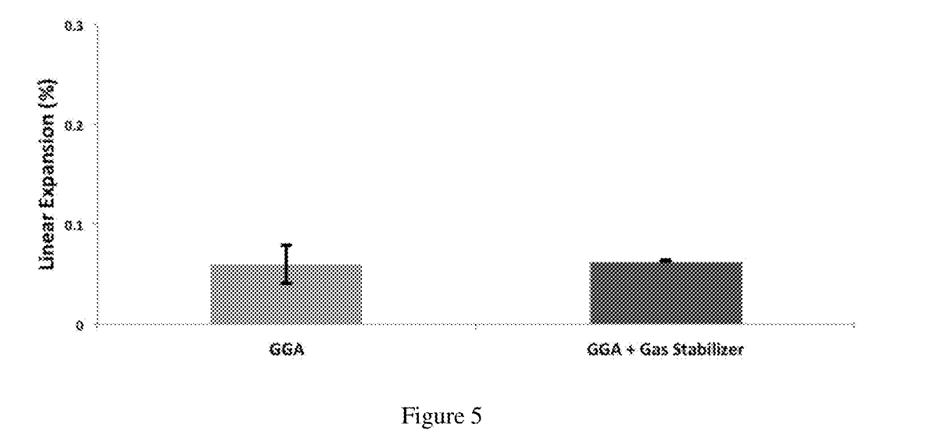
FIG. 5 is a plot illustrating the effect of a gas generating agent and a gas stabilizer on the linear expansion of a cement system that does not contain an antifoam agent.

Compressive strength development was measured with an Ultrasonic Cement Analyzer. The results show that the slurry that contained both the GGA and the gas stabilizer developed compressive strength at a faster rate (FIG. 4).

Example 3

Two cement slurries were prepared that did not contain an antifoam agent. Table 7 shows the composition of a slurry that contained a gas generating agent (GGA) but no gas stablizer. Table 8 shows the composition of a slurry that contained a gas generating agent and a gas stabilizer. All slurries were made with Class H cement. The density of all slurries was 1965 kg/m$^3$ (16.4 lbm/gal) and the water-to-cement ratio was 39%.

TABLE 4

Additives in slurry without gas generating agent and gas stabilizer.

| Additives | |
|---|---|
| Silica flour (% by weight of cement) | 35 |
| Silica fume (% by weight of cement) | 9 |
| Crystalline silica, sodium glucoheptonate (% by weight of cement) | 0.40 |
| AMPS/acrylamide copolymer, ammonium salt used as Fluid Loss Additive (% by weight of cement) | 0.40 |
| Dimethyl siloxanes and silicones solution used as antifoam agent (L/tonne) | 3.17 |
| Aqueous solution of salt of polynaphthalene sulfonate used as dispersant (L/tonne) | 12.00 |

TABLE 5

Additives in slurry with gas generating agent and without gas stabilizer.

| Additives | |
|---|---|
| Silica flour (% by weight of cement) | 35 |
| Silica fume (% by weight of cement) | 9 |
| Crystalline silica, sodium glucoheptonate (% by weight of cement) | 0.40 |
| AMPS/acrylamide copolymer, ammonium salt used as Fluid Loss Additive (% by weight of cement) | 0.40 |
| Dimethyl siloxanes and silicones solution used as antifoam agent (L/tonne) | 3.17 |
| Aqueous solution of salt of polynaphthalene sulfonate used as dispersant (L/tonne) | 3.17 |
| Coated aluminum powder suspended in glycol used as GGA (L/tonne) | 8.88 |

TABLE 6

Additives in slurry with gas generating agent and gas stabilizer.

| Additives | |
|---|---|
| Silica flour (% by weight of cement) | 35 |
| Silica fume (% by weight of cement) | 9 |
| Crystalline silica, sodium glucoheptonate (% by weight of cement) | 0.40 |
| AMPS/acrylamide copolymer, ammonium salt used as Fluid Loss Additive (% by weight of cement) | 0.40 |
| Dimethyl siloxanes and silicones solution used as antifoam agent (L/tonne) | 3.17 |
| Aqueous solution of salt of polynaphthalene sulfonate used as dispersant (L/tonne) | 12.00 |
| Aqueous Mixture of Polyglycols, Oxyalkylates, and Methanol used as gas stabilizer | 8.88 |

TABLE 7

Additives in slurry with gas generating agent and without gas stabilizer and antifoam.

| Additives |
| --- |
| Aqueous solution of salt of polynaphthalene sulfonate used as dispersant (L/tonne) |
| AMPS/acrylamide copolymer, ammonium salt and sodium chloride solution used as fluid-loss additive (L/tonne) |
| Polysaccharide Biopolymer used as anti-settling additive (% by weight of cement) |
| Sodium Lignosulfonate Cement Retarder (L/tonne) |
| Coated aluminum powder suspended in glycol as gas generating agent (L/tonne) |

TABLE 8

Additives in slurry with gas generating agent and gas stabilizer and without anitfoam.

| Additives | |
| --- | --- |
| Aqueous solution of salt of polynaphthalene sulfonate used as dispersant (L/tonne) | 12.00 |
| AMPS/acrylamide copolymer, ammonium salt and sodium chloride solution used as fluid-loss additive (L/tonne) | 12.00 |
| Polysaccharide Biopolymer used as anti-settling additive (% by weight of cement) | 0.30 |
| Sodium Lignosulfonate Cement Retarder (L/tonne) | 6.00 |
| Coated aluminum powder suspended in glycol as gas generating agent (L/tonne) | 8.88 |
| Aqueous Mixture of Polyglycols, Oxyalkylates, and Methanol as gas stabilizer (L/tonne) | 8.88 |

Linear expansion of the two slurries was measured after curing for one week at 79° C. and 20.9 MPa pressure. The results show that, in the absence of an antifoam agent, the effectiveness of the gas stabilizer as a contributor to expansion is lower.

The examples presented herein are for illustrative purposes and do not limit the scope of the disclosure.

The invention claimed is:

1. A method for cementing a subterranean well, comprising:
 (i) preparing a composition comprising water, an inorganic cement, a gas generating agent and a gas stabilizer, wherein the gas generating agent releases hydrogen, carbon dioxide or nitrogen gas or a combination thereof;
 (ii) placing the composition in the well; and
 (iii) allowing the composition to set and develop a compressive strength at a rate,
 wherein the gas stabilizer improves the compressive strength, increases the rate at which compressive strength develops, preserves cement homogeneity, or enhances cement expansion or a combination thereof,
 wherein the gas stabilizer comprises an aqueous mixture comprising polyglycols, oxyalkylates and methanol, or coco trimethyl ammonium chloride, or a mixture comprising ammonium fatty alcohol ether sulfate and ethylene glycol monobutyl ether, or combinations thereof.

2. The method of claim 1, wherein the composition is placed in an annulus between a tubular body and a wellbore wall, or an annulus between two tubular bodies.

3. The method of claim 1, wherein the composition is placed during remedial cementing.

4. The method of claim 1, wherein the inorganic cement comprises Portland cements, calcium aluminum cements, fly ashes, lime-silica mixtures, zeolites, blast furnace slags, geopolymers or chemically bonded phosphate ceramics or combinations thereof.

5. The method of claim 1, wherein the gas generating agent comprises aluminum at a concentration between 0.07% and 1.00% by weight of cement.

6. The method of claim 1, wherein the gas stabilizer is present at a concentration between 4.45 and 26.7 L/tonne.

7. A method, comprising:
 (i) preparing a composition comprising water, an inorganic cement, a gas generating agent and a gas stabilizer;
 (ii) placing the composition in the well; and
 (iii) allowing the composition to set and the gas generating agent to release hydrogen, carbon dioxide or nitrogen gas or a combination thereof;
 wherein the set composition has an improved compressive strength, a faster rate at which compressive strength develops, an inproved cement homogeneity, an enhanced cement expansion or a combination thereof,
 wherein the gas stabilizer comprises an aqueous mixture comprising polyglycols, oxyalkylates and methanol, or coco trimethyl ammonium chloride, or a mixture comprising ammonium fatty alcohol ether sulfate and ethylene glycol monobutyl ether, or combinations thereof.

8. The method of claim 7 wherein the composition is placed in an annulus between a tubular body and a wellbore wall, or an annulus between two tubular bodies.

9. The method of claim 7, wherein the composition is placed during remedial cementing.

10. The method of claim 7, wherein the inorganic cement comprises Portland cements, calcium aluminum cements, fly ashes, lime-silica mixtures, zeolites, blast furnace slags, geopolymers or chemically bonded phosphate ceramics or combinations thereof.

11. The method of claim 7, wherein the gas generating agent comprises aluminum at a concentration between 0.07% and 1.00% by weight of cement.

12. The method of claim 7, wherein the gas stabilizer is present at a concentration between 4.45 and 26.7 L/tonne.

* * * * *